(12) United States Patent
Matsuda

(10) Patent No.: US 6,454,621 B2
(45) Date of Patent: Sep. 24, 2002

(54) FUEL COOLING SYSTEM FOR SMALL WATERCRAFT ENGINE

(75) Inventor: Yoshimoto Matsuda, Kobe (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 09/759,147

(22) Filed: Jan. 16, 2001

(30) Foreign Application Priority Data

Jan. 18, 2000 (JP) .......................................... 2000-008853

(51) Int. Cl.[7] ............................................... B63H 21/10
(52) U.S. Cl. ........................................................ 440/88
(58) Field of Search ............................. 440/38, 88, 111; 123/516, 457

(56) References Cited

U.S. PATENT DOCUMENTS 4,768,492 A * 9/1988 Widmer et al. .............. 123/541
4,768,983 A * 9/1988 Smith ........................... 440/111
6,035,830 A * 3/2000 Saito ............................ 123/457

FOREIGN PATENT DOCUMENTS

JP          A-60-104760          6/1985

* cited by examiner

Primary Examiner—Ed Swinehart
(74) Attorney, Agent, or Firm—Oliff & Berridge, PLC

(57) ABSTRACT

A circulating fuel supply apparatus for an engine of a small watercraft, formed so as to supply fuel in a fuel tank to at least one injector via a fuel supply pipe using a fuel pump. The apparatus returns excess fuel in at least one injector to the fuel tank via a fuel return pipe. A heat exchanger uses externally obtained cooling water as a fuel cooling device in the portion of the fuel supply pipe which is between the fuel pump and the injector. As the fuel which is about to enter the injector is cooled, a sufficiently cooled fuel can be supplied to at least one injector as compared with a case where return fuel is cooled, thus enabling the injector to carry out proper fuel injection operation.

12 Claims, 3 Drawing Sheets

FUEL COOLING SYSTEM FOR SMALL WATERCRAFT ENGINE

BACKGROUND OF THE INVENTION

1. Field of Invention

The invention relates to a fuel cooling system for a circulating fuel supply apparatus of an engine for a small watercraft, adapted to be supplied fuel into an injector from a fuel tank through a fuel supply pipe by a fuel supply pump, and to return excess fuel in the injector to a fuel tank through a fuel return pipe.

2. Description of Related Art

FIG. 6 shows a basic configuration of a circulating fuel supply apparatus. It is provided in an outboard engine, in which a fuel inlet port 14a of each injector 14 is connected to a fuel tank 6 via a fuel supply pipe 17 and a fuel pump 18, and an excess fuel return port 14b of each injector 14 is connected to the fuel tank 6 via a return pipe 19 and a vapor separator 50.

When such a circulating fuel supply apparatus, as shown in FIG. 6, is applied to the engine of a small watercraft, fuel temperature increases for the following reasons:

(1) When the fuel supply apparatus is operated in midsummer, the fuel tank itself is heated by the sunlight to cause the fuel temperature to increase in the interior of the fuel tank. Especially, a small watercraft that is used primarily in summer, has an engine compartment in the hill that has small dimensions as compared with those of an automobile or larger boat. The fuel tank is provided in a small space in the engine compartment with the engine, so that the temperature in the interior of the fuel tank 6 increases even more.

(2) In the circulating fuel supply apparatus, a part of fuel supplied by the fuel pump is used for the injection by the injector, and the remaining fuel in the injector is returned as an excess fuel to the fuel tank, so that the fuel, the temperature of which has been increased in the interior of the injector, returns with the increased temperature to the fuel tank. Therefore, the temperature in the interior of the fuel tank increases gradually as the operation of the circulating fuel supply apparatus continues.

In the case where an electromagnetic solenoid, for opening and closing a valve of the injector, is contained in the injector, the temperature of the injector itself increases, and this also constitutes one of the reasons for the rise in temperature of the fuel.

When fuel temperature increases excessively, variation occurs in the movements of the electromagnetic valve in the injector, and it is conceivable that proper fuel injection by the injector becomes difficult.

In order to prevent the fuel temperature rise in the circulating fuel supply apparatus in the prior art, as shown in FIG. 6, the vapor separator 50 is provided in the return pipe 19 of an outboard engine for cooling the fuel, whereby the vapor separator 50 works to remove a vaporized component of a return fuel and to cool the fuel. The vapor separator 50 can be provided only in the return pipe 19 which is low pressure due to the structure thereof. The related art is disclosed in Japanese KOUKAI Patent No. SHO60-104760.

In a circulating fuel supply apparatus in which the vapor separator 50 is provided in the return pipe 19, as shown in FIG. 6, the cooling effect for the fuel supplied to the injectors 14 is low, as will be described in the following:

(1) The quantity of the fuel returning from the return pipe 19 to the fuel tank 6 is small as compared with an absolute quantity of the fuel in the fuel tank 6. Therefore, even when the small quantity of the return fuel is cooled by the vapor separator 50, it can not sufficiently reduce the temperature of the fuel in the fuel tank. Consequently, it is difficult to sufficiently cool the fuel supplied to the injectors 14.

(2) A vaporized component is mixed in large quantities in the return fuel. Therefore, even when the fuel is cooled as a gas-liquid separation operation is carried out in the vapor separator 50, the cooling of the fuel is difficult as compared with that of the liquid component alone.

SUMMARY OF THE INVENTION

The invention has been made in view of the above circumstances, and provides a circulating fuel supply apparatus for a engine of a small watercraft, having a cooling device with a simple structure, and adapted to cool the fuel in the apparatus efficiently and supply the resultant fuel to an injector so as to repress, or minimize, vaporization of the fuel. Thus, cooling of the injector is done with a high reliability, and injection of the fuel by the injector is done properly.

The invention provides a circulating fuel supply apparatus for an engine of a small watercraft, which is adapted to supply a fuel in a fuel tank to an injector via a fuel supply pipe by means of a fuel pump. The fuel supply apparatus returns excess fuel from the injector to the fuel tank via a fuel return pipe and has a fuel cooling device in the portion of the fuel supply pipe which is between the fuel pump and the injector.

With such an apparatus, the fuel drawn from the fuel tank and about to enter the injectors is cooled by the fuel cooling device. This enables the fuel to be cooled and then supplied to the injectors efficiently as compared with a case where the return fuel is cooled. As a result, injection of the fuel is done properly by the injectors.

Preferably, the circulating fuel supply apparatus for the engine of the small watercraft has a heat exchanger that uses a cooling water as the fuel cooling device. This enables the fuel cooling device to be simplified, and the manufacturing costs to be reduced.

Preferably, the heat exchanger uses, as cooling water, an exchanger external cooling water taken in from the outside by a water jet propulsion unit of the watercraft, and the external cooling water which has been used to cool the fuel is discharged to the outside of the watercraft. Such enables maintenance of the cooling water to be done simply, the running costs to be reduced, and the fuel cooling effect to be increased as compared with a similar apparatus in which the internal cooling water is circulated in a closed circuit.

These objectives as well as other features and advanceges of the invention will become more apparent to those skilled in the art from the following description with refrrance to the accompanying drawings.

DETAILED DESCRIPTION OF PREFERRED EMBODIMENTS

Figure 1:
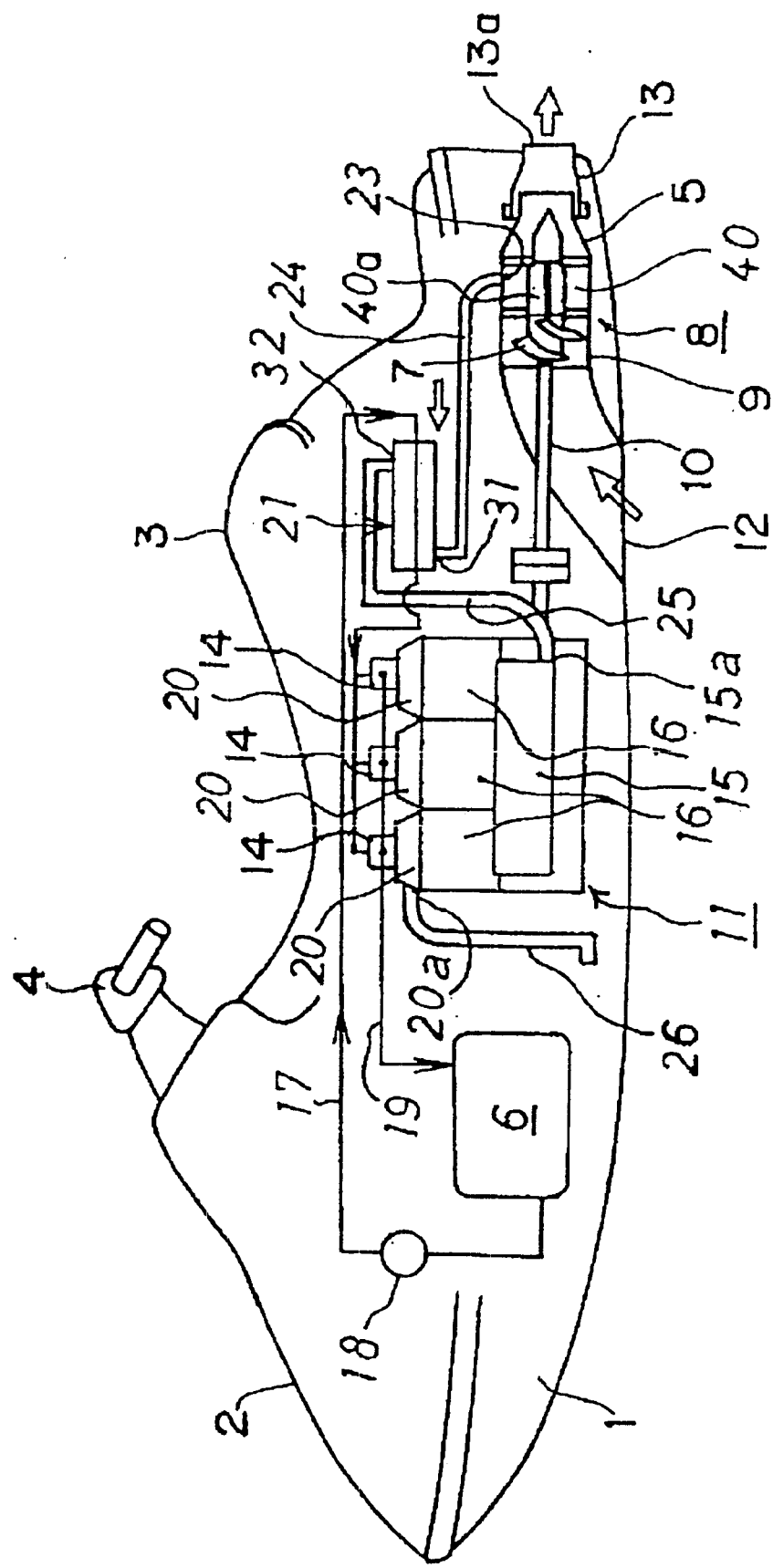
FIG. 1 is a side view of a small watercraft to which the invention is applied.

FIG. 1 is a schematic side view showing the interior of a small watercraft to which the invention is applied. First, the general structure of the small watercraft will be described. The body of the small watercraft is formed of a hull 1 and a deck 2 is disposed thereon. A straddle type seat 3 and a handle 4 are provided on an upper side of the deck 2. In a rear portion of the hull 1, a water jet propulsion unit 8, including a duct 9, guide blades (flow setting plates) 40, an ejection, or jet, nozzle 5, and an impeller 7 are provided. Fixed to the rear of the ejection nozzle 5 is a laterally controllable steering nozzle 13. The impeller 7 is housed in the duct 9 and connected to an output shaft of an engine 11 via an impeller (driving) shaft 10. A rear end portion of the impeller shaft 10 is supported rotatably in a bearing case 40a retained by the guide blades 40. In accordance with a rotation of the impeller 7, water is sucked from a water intake port 12 in a bottom wall of the hull 1 into the duct 9, and ejected from a rear end discharge port 13a of the steering nozzle 13 via the guide blades 40, and a jet nozzle 5. An engine 11 is a direct injection type 3-cylinder 2-cycle engine, disposed in the engine compartment provided below the seat 3, and having an injector 14 in each cylinder head 20. A fuel tank 6 is provided ahead of the engine in the hull.

Figure 2:
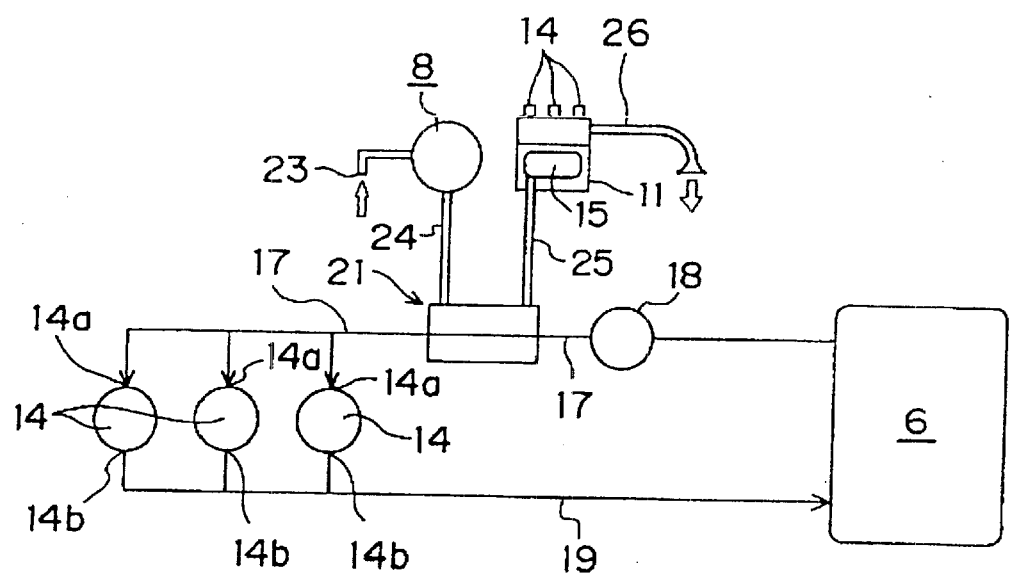
FIG. 2 is a schematic piping diagram of a circulating fuel supply apparatus shown in FIG. 1.
Figure 6:
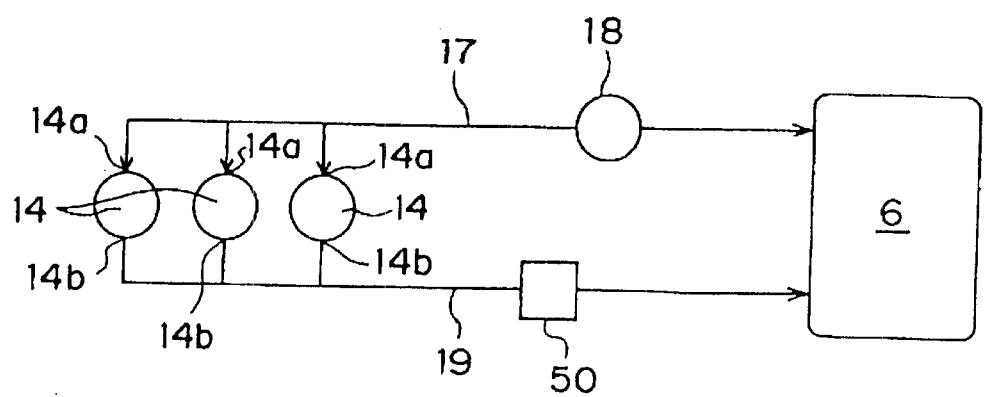
FIG. 6 is a schematic piping diagram showing an example of a related art circulating fuel supply apparatus.

A circulating fuel supply apparatus will now be described. A basic structure of the apparatus is similar to that of the above described related art shown in FIG. 6. As shown in FIG. 2, an inlet port 14a of each injector 14 is connected to the fuel tank 6 via a fuel supply pipe 17 and a fuel pump 18, and an excess fuel return port 14b of the injector 14 is connected to the fuel tank 6 via a return pipe 19. Namely, the fuel is sucked from the fuel tank 6 by the fuel pump 18, then pressurized, and supplied to each injector 14 via the fuel supply pipe 17 by the fuel pump 18. Excess fuel in the injectors 14 is returned to the fuel tank 6 via the return pipe 19. Although FIG. 2 shows three injectors 14 in a left portion thereof, in addition to the three injectors 14 drawn on the upper side of the engine 11, they are one and the same three injectors 14. The injectors 14, shown in the left portion of the drawing, are drawn between the fuel supply pipe 17 and return pipe 19 for the purpose of more clearly showing the fuel circulating path.

The above described circulating fuel supply apparatus has a heat exchanger 21 for cooling the fuel. The heat exchanger 21 is provided in the portion of the fuel supply pipe 17 which is between the fuel pump 18 and the injectors 14.

The path of the cooling water used for the heat exchanger 21 will now be described. As shown in FIG. 1, a cooling water intake port 23 is opened in the portion of the interior of the water jet propulsion unit 8 which corresponds to the guide blades 40. The cooling water intake port 23 is connected to a cooling water inlet port 31 of the heat exchanger 21 via a cooling water pipe 24. A cooling water outlet port 32 of the heat exchanger 21 is connected to a cooling water jacket inlet port 15a of an inlet manifold 15 of the engine 11 via a cooling water pipe 25, and a cooling water jacket in the inlet manifold 15 communicates with water jackets in cylinders 16 and cylinder heads 20 of the engine 11. A cooling water pipe 26 a cooling water jacket port 20a of the cylinder heads 20. The cooling water discharge pipe 26 is adapted to discharge used cooling water to the outside of the small watercraft.

Figure 3:
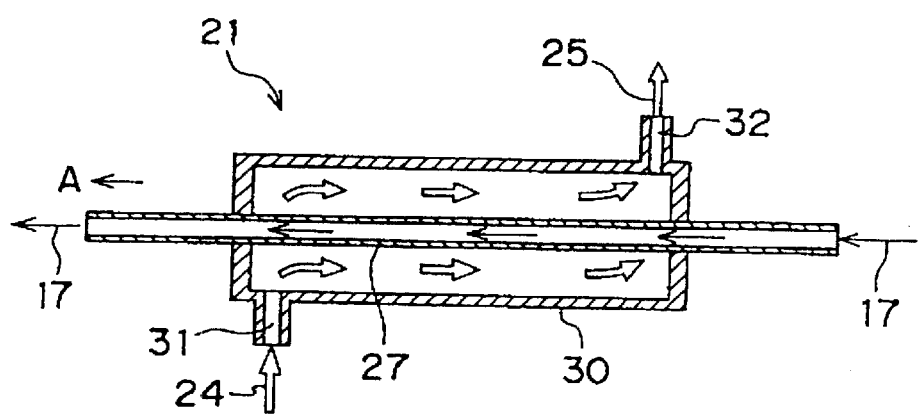
FIG. 3 is an enlarged longitudinal section of a heat exchanger shown in FIG. 2.

FIG. 3 shows a preferred embodiment of the heat exchanger 21. The heat exchanger 21 is formed of an outer case 30 of aluminum for the cooling water, and an inner pipe 27 of stainless steel for the fuel which is disposed coaxially in and extends through the outer case 30. The inner pipe 27 for the fuel is connected at both ends of the case to the fuel supply pipe 17. The cooling water inlet port 31 is provided at a lower end of a fuel downstream side portion of the outer case 30 with respect to a flow of the fuel (direction of an arrow A), and the cooling water outlet port 32 is provided at an upper end of a fuel upstream side portion of the outer case 30.

As shown in FIG. 2, the fuel in the fuel tank 6 is sucked, pressurized, and sent under pressure into the fuel supply pipe 17 by the fuel pump 18, passed through the heat exchanger 21 in which the fuel is cooled with the cooling water, and then sent under pressure into the injectors 14 from which a part of fuel is injected into combustion chambers of the engine (not shown). In this structure, the fuel in the heat exchanger 21 hardly includes vaporized fuel. Therefore, the fuel cooling effect is higher than as compared with that in a case where the return fuel is cooled.

The quantity of the fuel injected by the injectors 14 into the combustion chambers in this embodiment is substantially not larger than a half of that discharged from the fuel pump 18. The excess fuel is returned to the fuel tank 6 through the return pipe 19.

The cooling water (external cooling water) is taken in from the outside through the cooling water intake port 23 by the water jet propulsion unit 8, enters the outer case 30 of the heat exchanger 2 1, of FIG. 3, via the cooling water pipe 24, and cools the fuel from an outer circumference of the inner pipe 27. After the cooling water is used for the fuel cooling operation, it is supplied from the cooling water outlet port 32 of the outer case to the inlet manifold 15, shown in FIG. 2, through the cooling water pipe 25, and then to the interior of the engine 11, whereby the inlet manifold 15, cylinder heads 20 and cylinder 16 of the engine 11 are cooled. The cooling water with which the engine 11 has been cooled is discharged to the exterior of the boat through the discharge pipe 26.

Because a one-way system that always uses fresh external cooling water is employed, the fuel cooling effect is large and the apparatus can be formed simply as compared with the effects obtained in a system in which an internal cooling water is circulated in a closed circuit.

Figure 4:
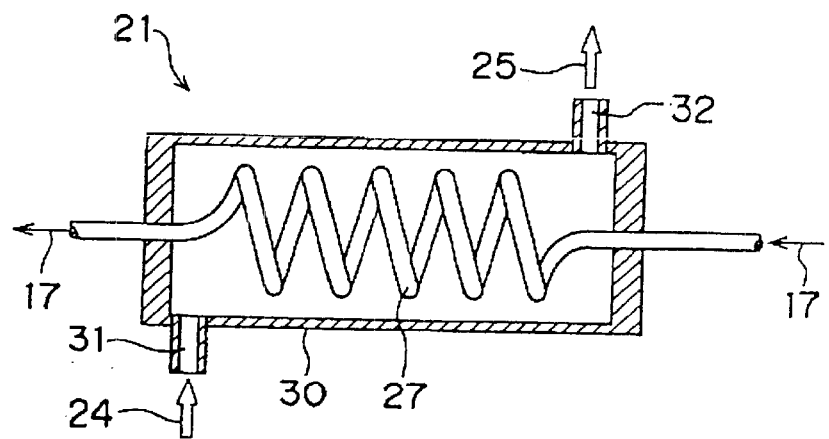
FIG. 4 is a longitudinal sectional view showing a modified example of the heat exchanger.

FIG. 4 shows a modified embodiment of the heat exchanger 21, in which an inner pipe 27 for fuel is formed spirally. Thus, the contact area (length) of the inner pipe 27 with respect to the cooling water is increased. The structure of the other parts is identical with that of the corresponding parts of the heat exchanger of FIG. 3.

Figure 5:
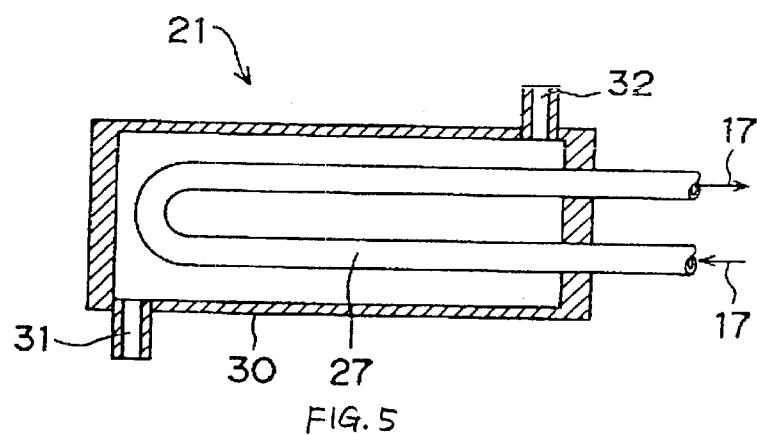
FIG. 5 is a longitudinal sectional view showing another modified example of the heat exchanger.

FIG. 5 also shows a modified embodiment of the heat exchanger 21, in which an inner pipe 27 for the fuel is formed in the shape of the letter "U" (the inner pipe U-type so as to have forwardly and backwardly extending portions), whereby the cooling water contact area of the inner pipe 27 is increased. In this case, the inlet and outlet side portions of the inner pipe 27 extend through the same side end wall of the outer case 30. The structure of the remaining parts is identical with that of the corresponding parts of the heat exchanger of FIG. 3.

Numerous modifications and alternative embodiments of the invention will be apparent to those skilled in the art in view of the foregoing description. Accordingly, the description is to be construed as illustrative only, and is provided for the purpose of teaching those skilled in the art the best mode for carrying out the invention. The details of the structure and/or function may be varied substantially without departing from the spirit of the invention and all modifications which come within the scope of the appended claims are reserved.

What is claimed is:

1. A circulating fuel supply apparatus for an engine of a small watercraft, adapted to supply a fuel in a fuel tank to an injector through a fuel supply pipe using a fuel pump, and returning excess fuel in the injector to the fuel tank through a fuel return pipe, comprising a fuel cooling device provided in the portion of the fuel supply pipe which is between the fuel pump and the injector, wherein a heat exchanger using a cooling water is provided as the fuel cooling device and an external cooling water, taken in from outside by a water jet propulsion unit provided in a hull of the small watercraft, is used as the cooling water for the heat exchanger and the cooling water which has been used to cool the fuel is discharged to the outside of the small watercraft.

2. A fuel coolant system used with a circulating fuel supply for a fuel injection engine having a fuel tank, a fuel supply pipe with a fuel pump, a plurality of fuel injectors and a return pipe to the fuel tank, the fuel coolant system comprising:
   a coolant intake;
   a heat exchanger surrounding the fuel supply pipe and receiving coolant from the coolant intake; and
   a coolant exhaust for exhausting coolant that has passed through the heat exchanger, the heat exchanger positioned on the fuel supply pipe between the fuel pump and the plurality of fuel injectors, wherein the fuel coolant system is used in a personal water craft (PWC) and the coolant is water taken from a body of water on which the PWC is operating and the coolant intake is a shared intake with a propulsion system of the PWC.

3. The fuel coolant system according to claim 2, wherein the coolant intake is a through hull intake in the PWC.

4. The fuel coolant system according to claim 2, wherein the coolant exhaust is an exhaust port from the PWC.

5. The fuel coolant system according to claim 4, wherein coolant exiting the heat exchanger is passed through a cooling water jacket of an engine of the PWC before exiting the exhaust port.

6. The fuel coolant system according to claim 2, wherein a portion of the fuel supply pipe passing through the heat exchanger has a coil shape.

7. The fuel coolant system according to claim 2, in a portion of the fuel supply pipe passing through the heat exchanger has a U-shape.

8. A small watercraft, comprising:
   a hull and deck forming a watercraft body;
   a fuel injected engine mounted in the body;
   a fuel tank mounted in the body;
   a fuel line between the fuel tank and fuel injectors of the engine;
   a water propulsion unit drivingly connected to the engine and having a steering nozzle extending from a stem of the body;
   a fuel pump on the fuel line between the fuel tank and the fuel injectors; and
   a fuel cooling device including:
      a through-hull water intake that feeds water to the water propulsion unit;
      a heat exchanger on the fuel line between the fuel pump and the fuel injectors;
      a coolant passage from the water propulsion unit to the heat exchanger; and
      a coolant exhaust from the heat exchanger.

9. The small watercraft according to claim 8, wherein the coolant exhaust includes an overboard discharge.

10. The small watercraft according to claim 8, wherein the coolant exhaust feeds into a coolant system for the engine.

11. The small watercraft according to claim 8, wherein a portion of the fuel line passing through the heat exchanger has a coil shape.

12. The small watercraft according to claim 8, wherein a portion of the fuel line passing through the heat exchanger has a U-shape.

* * * * *